(12) United States Patent
Chen et al.

(10) Patent No.: US 10,049,436 B1
(45) Date of Patent: Aug. 14, 2018

(54) ADAPTIVE DENOISING FOR REAL-TIME VIDEO ON MOBILE DEVICES (71) Applicant: GOOGLE INC., Mountain View, CA (US)

(72) Inventors: Jing Chen, Fremont, CA (US); Marco Paniconi, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 185 days.

(21) Appl. No.: 15/232,212

(22) Filed: Aug. 9, 2016

Related U.S. Application Data (60) Provisional application No. 62/235,218, filed on Sep. 30, 2015.

(51) Int. Cl.
H04N 7/15 (2006.01)
G06T 5/00 (2006.01)
H04N 7/14 (2006.01)

(52) U.S. Cl.
CPC .............. *G06T 5/002* (2013.01); *H04N 7/147* (2013.01); *H04N 7/15* (2013.01)

(58) Field of Classification Search
CPC ........... G06T 5/002; H04N 7/15; H04N 7/147
See application file for complete search history.

(56) References Cited

U.S. PATENT DOCUMENTS

| 7,110,455 | B2 | 9/2006 | Wu et al. | |
| 8,675,102 | B2 * | 3/2014 | Baqai | G06T 5/002 348/241 |
| 8,737,464 | B1 | 5/2014 | Zhang et al. | |
| 2010/0309987 | A1 | 12/2010 | Concion et al. | |

* cited by examiner

*Primary Examiner* — Nam Pham (57) ABSTRACT

A method and apparatus for adaptive denoising of source video in a video conference application is provided. Video captured is analyzed on a frame by frame basis to determine whether denoising of the frame should be performed prior to providing the source frame to an encoder. If the frame is to be denoised, the frame is divided into a plurality of blocks and a local denoising process is performed on a block per block basis.

24 Claims, 10 Drawing Sheets

Frame T

FIG. 6A

Frame T+1

ADAPTIVE DENOISING FOR REAL-TIME VIDEO ON MOBILE DEVICES

The present application claims priority to U.S. Provisional Patent Application Ser. No. 62/235,218, filed Sep. 30, 2015, the entire disclosure of which is hereby incorporated by reference.

BACKGROUND

Video conferencing with mobile devices is becoming more and more common place. However, video captured with a mobile device is often noisy due to the space/size constraints of the video capturing devices on the mobile device.

The video capturing device, e.g., camera, charge-coupled device (CCD), CMOS image sensor, and the like, provided in mobile devices have much smaller image sensors then stand-alone cameras. As a result, when video is captured/recorded on a mobile device, especially in low-light conditions, the resulting images/video are often noisy. Although there are various known processes for reducing noise from captured video footage, many of these known processes are not only processor intensive but are not capable of being implemented in real-time applications such as video conferencing. Furthermore, many conventional real-time denoising algorithms are codec specific.

Accordingly, a need exists for a codec independent denoising process capable of meeting the processing requirements of video conferencing application on mobile devices.

SUMMARY

This specification describes technologies relating to temporal noise filtering in general, and specifically to methods and systems for adaptive denoising of source video in a video conferencing application where in the denoising process is independent of the utilized codec.

In general, one aspect of the subject matter described in this specification can be embodied in a method for adaptive denoising of source video in a video conferencing application. The method comprising: buffering a plurality of source frames from captured video in a source frame buffer; filtering the buffered source frames to identify source frames for further processing; for each of the filtered source frames: dividing the filtered source frame into a plurality of blocks, each block having N×N pixels, N being an integer; performing a temporal denoising process on each of the plurality of blocks; combining the plurality of denoised blocks in to an output frame; and scanning the denoised blocks of the output frame and for each denoised block, determining whether to keep the denoised block or replace it with its corresponding block from the filtered source frame; and providing the scanned output frames to an encoder.

The adaptive denoising method may further include: encoding the scanned output frames into a bitstream; transmitting the bitstream to a destination device; and parsing the bitstream to extract quantization parameters and motion vectors and using the extracted information to filter the buffered source frames. For example, filtering the buffered source frames may include, for each buffered source frame: determining whether the average quantization employed in the bitstream satisfies a predefined threshold; in response to the predefined threshold being satisfied, copying the buffered source directly to an output frame without denoising and providing the output frame to the encoder; and in response to the predefined threshold not being satisfied, outputting the filtered source frame for further processing.

These and other embodiments can optionally include one or more of the following features. Filtering the buffered source frame may include further processing each of the buffered frames. Sequentially processing each denoised block within the output frame to determine whether it is a skin block. Sequentially processing each denoised block within the output frame to determine whether a set of connecting neighbor blocks have been denoised. Scanning the denoised blocks of the output frame by processing the denoised block in the output frame using a checkerboard pattern such that every other denoised block in the output frame is sequentially processed starting with the odd blocks and then the even blocks. For every other frame, the sequential processing of the denoised blocks in a checkerboard pattern starts with the even blocks and then the odd blocks.

The details of one or more embodiments are set forth in the accompanying drawings which are given by way of illustration only, and the description below. Other features, aspects, and advantages of the disclosed embodiments will become apparent from the description, the drawings, and the claims. Like reference numbers and designations in the various drawings indicate like elements.

DETAILED DESCRIPTION

The disclosed embodiments provide systems and methods for adaptive denoising of source video in a video conference application on for example, mobile devices.

Figure 1:
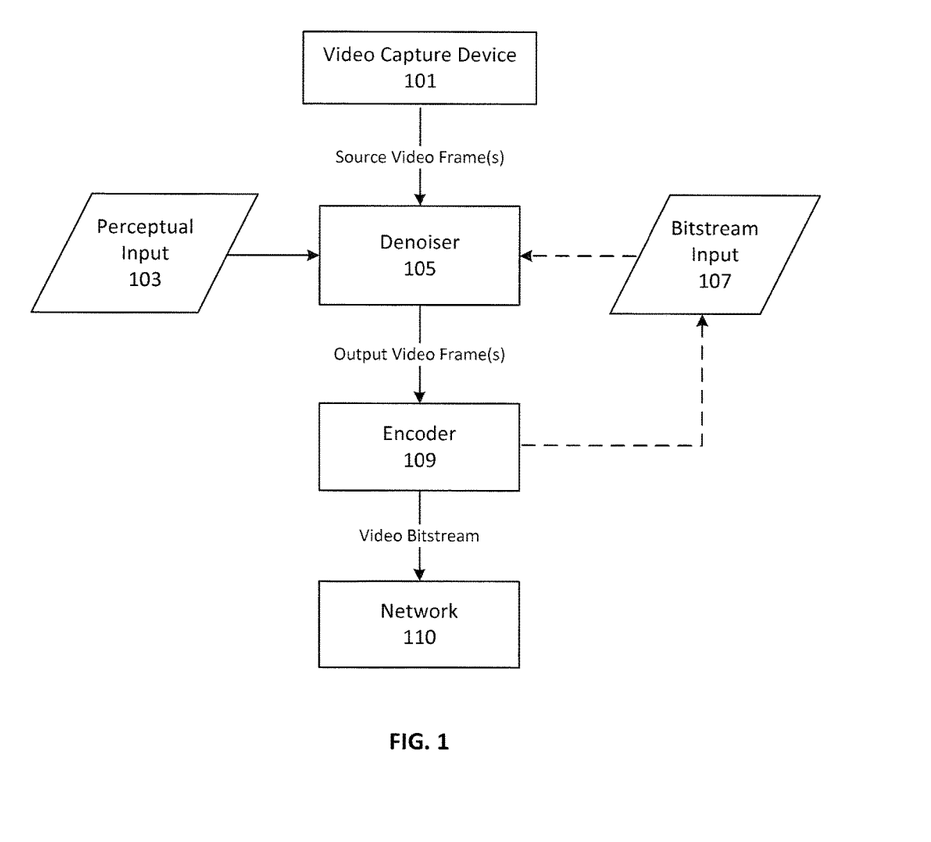
FIG. 1 is a block diagram illustrating a device for video conferencing according to an exemplary embodiment.

As shown in FIG. 1, the conferencing device includes a video capture device 101, for example, a camera, charge-coupled device (CCD), CMOS image sensor, and the like, a denoiser 105 which receives raw source frames from the video capture device 101 and provides output frames to the encoder 109. The encoder 109 encodes the video frames received from the denoiser 105 and generates a video bitstream using any suitable codec. The video bitstream is provided to the network 110 for transmission to one more destination devices (not shown) using conventional methodologies. The denoiser 105 also has access to perceptual input 103 which may be used in the denoising process, as discussed in more detail below. The encoder may also feed the bitstream and/or information from the bitstream to the denoiser 105. The denoiser 105 may use the bitstream input 107 to perform optional global and/or local filtering discussed in greater detailed below.

According to certain embodiments, the denoiser 105 receives raw video frames, also referred to herein as source frame(s), from the video capture device/module 101 and applies denoising before sending the output video frame(s) to the encoder 109, which then outputs the encoded frame (s), also referred to herein as the video bitstream, to the network 110. The denoiser 105 provides an adaptive denoising process that removes noise from the raw video frames using any suitable temporal denoising algorithm that calculates a recursive average of current raw video frames with a previous denoised frames. In order to lower the complexity of the denoising process, the denoiser 105 may use perceptual data as input, and optionally, input from the bitstream of past encoded frames as discussed in more detailed below.

Figure 2:
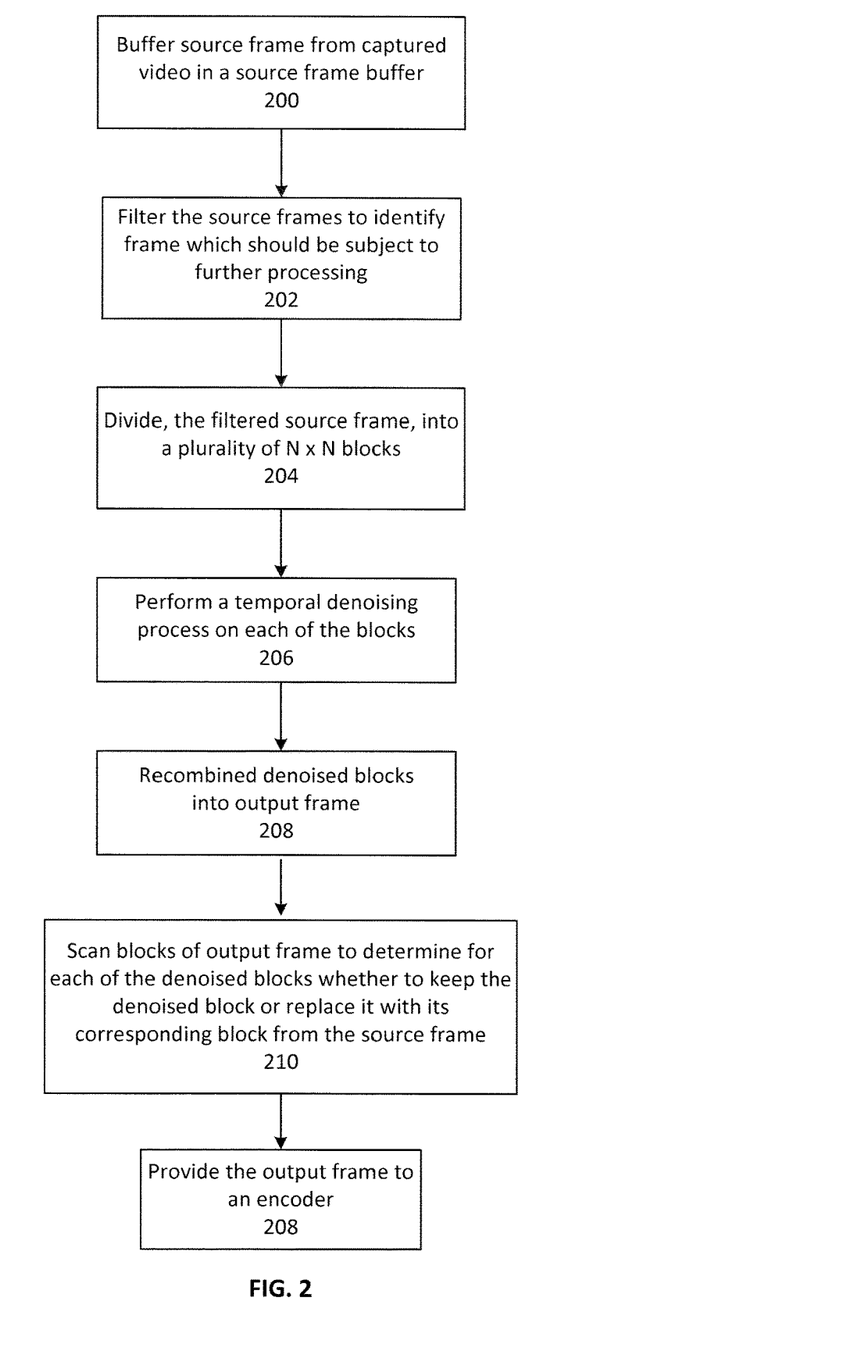
FIG. 2 is a block diagram illustrating an exemplary denoising process for source video in a video conferencing application.
Figure 3A:
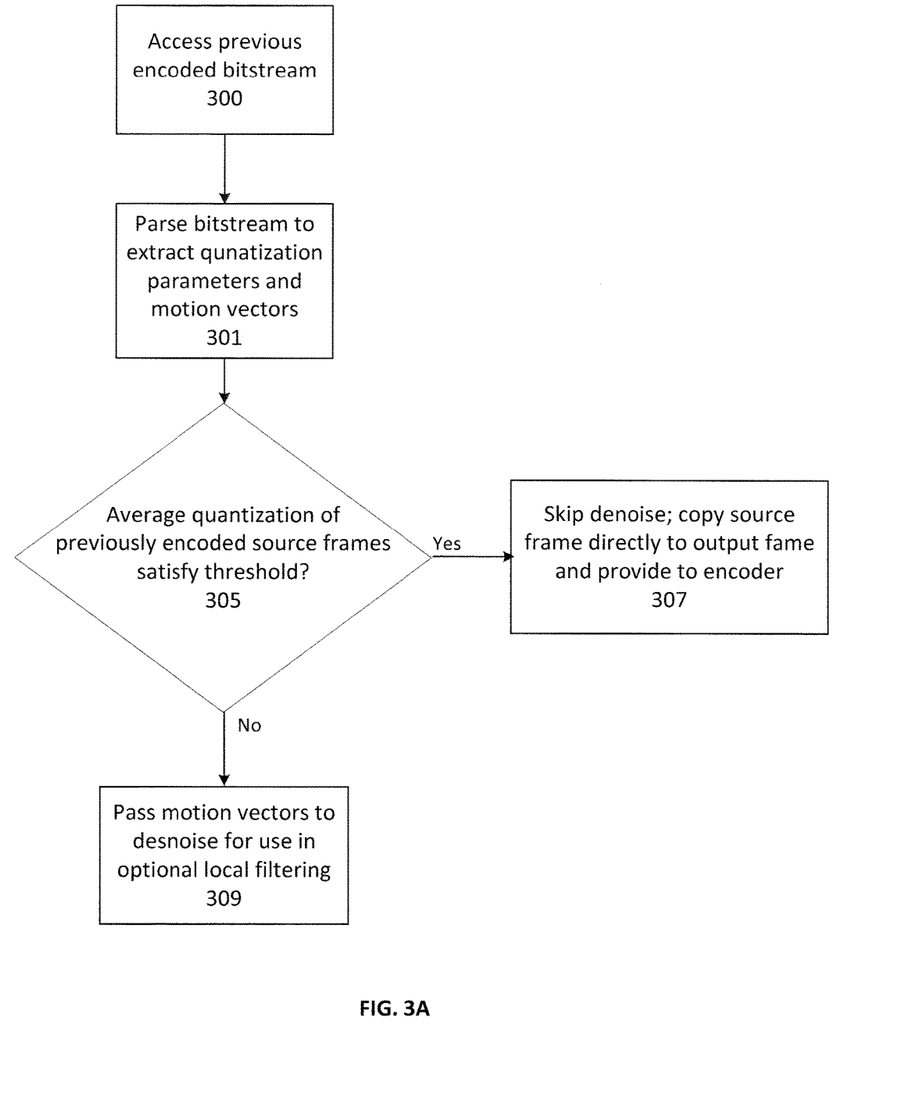
FIGS. 3A and 3B are block diagrams illustrating an exemplary global and local, respectively, filtering process according to an embodiment.

An exemplary adaptive denoising process for reducing noise in a video conferencing application is shown in FIG. 2. Source frames from the video capture device 101 are buffered in a source frame buffer (200). The buffered source frames may be filtered to identify one or more frames which should be not be further processed (202). This filter may simple forward all the source frames for further processing and/or use the bitstream information 107 of filter out source frame as shown in FIG. 3.

Once a determination is made to perform the denoising process, the filtered source frame is divided into L blocks, each block having N×N pixels (204). Both L and N are integers and L equals the total number of pixels in the source frame divided by $N^2$. The number N of pixels in each block may be selected using any suitable algorithm. Preferably, the resolution of the raw video frame factors into the selection of N such that the N used for high definition video is larger than the N used for standard definition video. For example, the buffered video frame may be divided into a plurality, L, of 16×16 blocks.

For each block, a temporal denoising process is performed (206). Then the denoised blocks are combined into an output frame (208). The output frame is then scanned block by block and a determination is made whether to keep the denoised block currently in the output frame, or replace it with its corresponding block from the filtered sourceframe (210). The scanned output frame is provided to the encoder which generates the video bitstream (212).

In the exemplary denoising process of FIG. 2, each buffered source frame may subjected to the denoising process, i.e., the filtering process does not eliminate any frames. However, in some situations it may be advantageous in terms of processing speed and/or output video quality to skip the denoising process for one or more frames. For example, if the quantization (QP) of a video bitstream is high the encoding process will mask the noise so there is no need to perform the denoising process. In addition, if the motion between frames is large, then the denoising process may introduce video artifacts which reduce the quality of the video output. Therefore, in these situations the source frames may be filtered such that frames satisfying one or more of the above conditions are directly provided to the encoder, thereby skipping the denoising process.

As shown in FIG. 1, the encoder 109 may feed bitstream information 107 back to the denoiser 105. The denoiser may use this bitstream information 107 to perform a global, i.e., frame by frame, filtering process as shown in FIG. 3. According to an exemplary process, the global filtering begins with accessing a bitstream of previously encoded source frames (300). The previous bitstream may be parsed to extract quantization parameters (QP) and/or the motion vectors from previous encoded source frames within the bitstream (301). Using the extracted information, e.g., the QP and/or motion vectors, the denoiser may select not to denoise a source frame if certain conditions are satisfied, for example, the average quantization satisfying a predefined threshold (Yes path out of 305). If the quantization utilized by the encoder 109 during the encoding process is at an certain level, the encoding process will mask noise in the video so there is no need to perform the denoising process prior to the encoding.

Figure 3B:
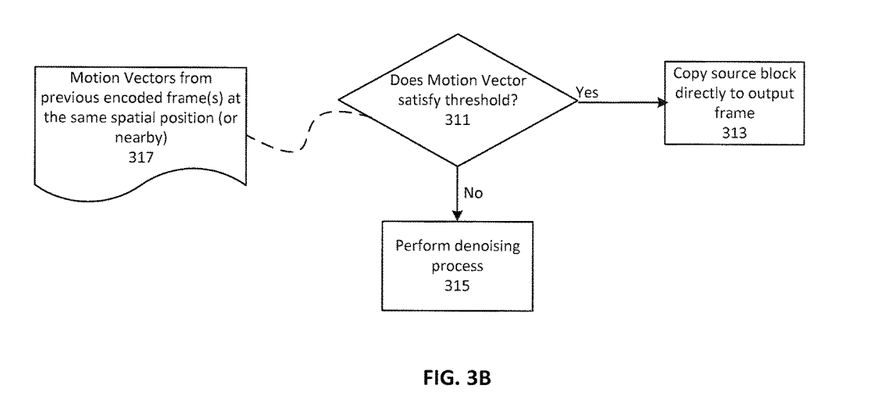

If the conditions are not satisfied (No path out of 305) then the extract motion vectors used to perform local, i.e., block by block, filtering. This optional local filtering, as shown in FIG. 3B compares the extracted motion vector MV from the previous encoded frame at the same or nearby spatial position as the block with a predefined threshold (311). If the motion vector satisfies the threshold (Yes path out of 311) denoising does not need to be performed on the selected block and the corresponding block from the source frame is directly copied to the output frame (313). If the motion vector does not satisfy the threshold (No path out of 311) then a temporal denoising is performed on the bock (315). The predetermined threshold may be determined using any suitable method. It is also well known that performing temporal denoising on high motion areas causes visual artifacts.

Figure 4:
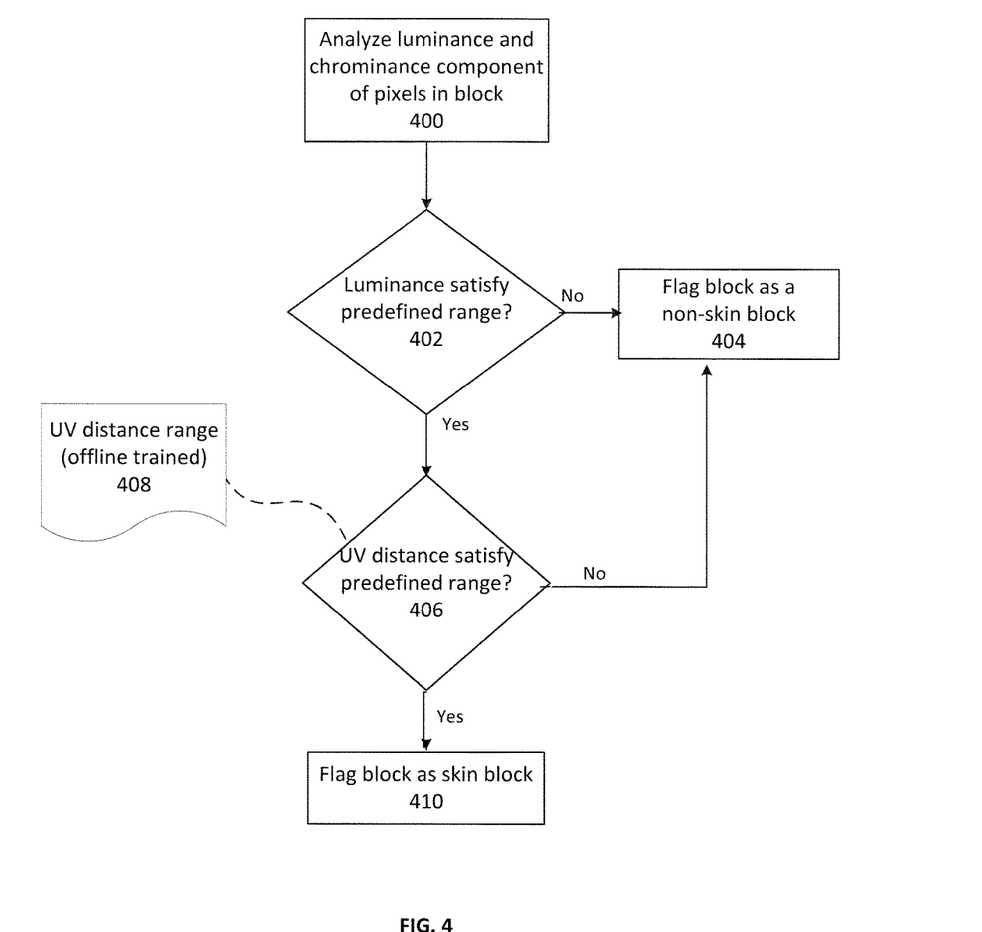
FIG. 4 is a block diagram illustrating an exemplary process for generating perceptual input according to an embodiment.
Figure 5:
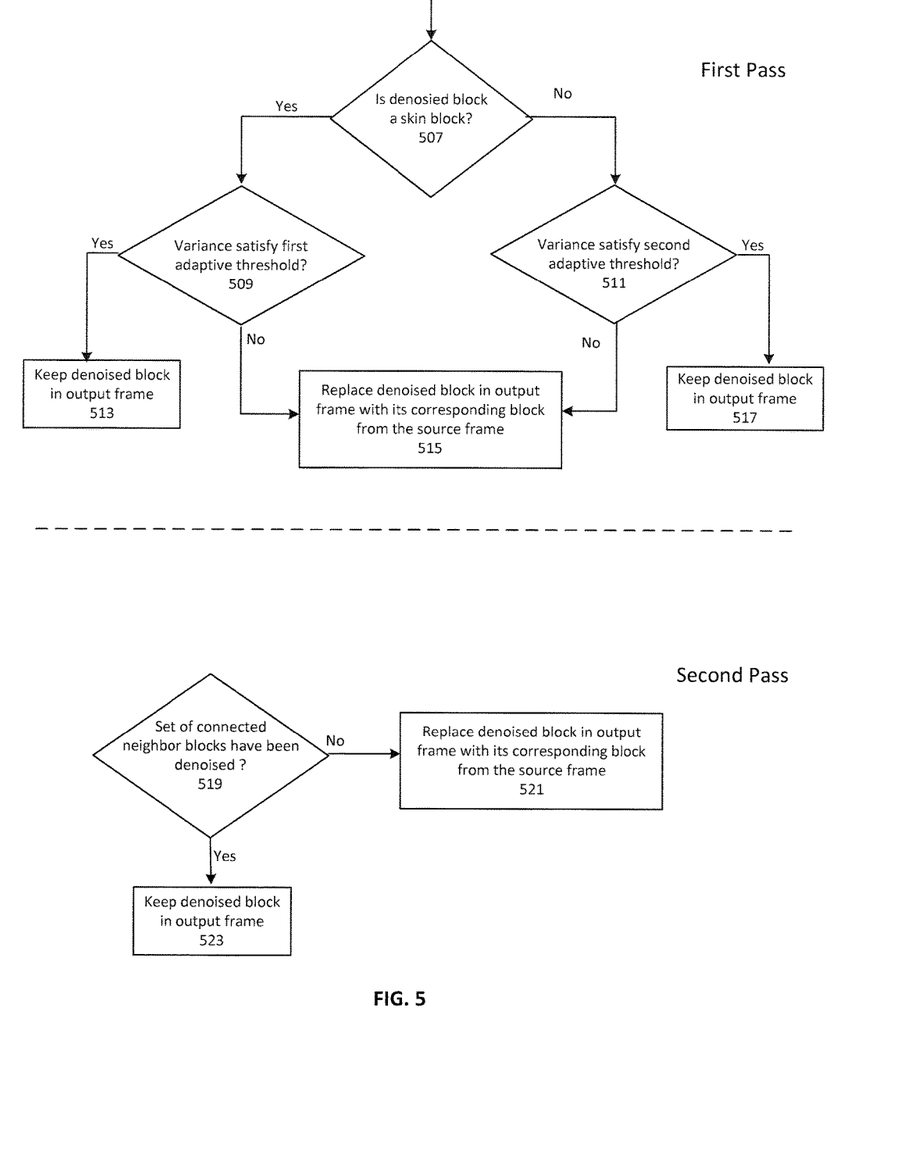
FIG. 5 is a block diagram illustrating an exemplary denoising process utilizing perceptual input according to an embodiment.

According to certain embodiments the output frame of denoised blocks is scanned prior to providing the output frame to the encoder (210). As shown in FIG. 5, the scanning process may comprise analyzing the denoised blocks of an output frame in a raster-scan order with a two passes, i.e., each block in the output frame is processed twice in sequential order. The first pass, of the two pass process, begins with determining whether the denoised block should remain in the output frame buffer or be replaced with its corresponding block from the source frame based on perceptual input data. The perceptual input data provides a model for determining whether a video frame being processed by the denoiser 105 includes a region of interest. For example, for video conferencing applications, the region of interest may be a user's face. Therefore, in certain implementations, the perceptual input data may be an off-line trained skin model for detecting skin areas in the raw video in a fast and effective manner. An exemplary process for detecting skin blocks is illustrated in FIG. 4. According to the embodiment shown in FIG. 5, a determination is then made as to whether or not the denoised block is a skin block (507). A skin block is a block having pixels representing areas of skin.

An exemplary process for detecting skin blocks begins with the color space of the raw pixel data within a block. As shown in FIG. 4, the process may use the three components, Y, U, and V, (sometime referred to as Y, Cb, Cr) of the raw pixel data. If the raw video data is not in the YUV color space, it may be converted to the YUV using known algorithms. The YUV color space defines the pixels of an image in terms of one luma, Y, (also referred to as the brightness) and two chrominance, UV, (also referred to as color) components. According to the exemplary process, the luminance or brightness of the raw pixel data is compared to a predefined range. To keep the complexity very low, only one sample pixel is used for each block to determine if the block is skin or not. In an exemplary embodiment, the sample pixel is the local average of Y, U, V over the M center pixels of each N×N block, where M and N are integers which are selected/adapted based on the frame resolution of the source video.

If the luminance Y is outside the predetermined range (No path out of 402) then the block is identified as a non-skin block (404). If the luminance Y is within the predefined range (Yes path out of 402), then the UV distance of the raw pixel data is compared to a cluster in the UV space (406), where the cluster shape/size is determined off-line and provided in the perceptual input 103, for example, the UV distance range (408) may be provided in a skin model. The UV distance range may be trained off-line on a test set of video sequences and then the thresholds/distances in the model may be set based on the off-line study. If the UV distance of the raw pixel data is outside of the predefined range (No path out of 406), then the block is identified as a non-skin block (404). If the UV distance is within the predefined range (Yes path out of 410), then the block is identified as a skin block (410). For each block in the source frame a flag may be set to identify whether or not the block is a skin block. The identification as a skin or non-skin block is used to determine which threshold comparison to satisfy and based on the respective threshold comparison whether or not to keep the denoised block or replace it with its corresponding block from the source frame as shown in FIG. 5.

Once the denoised block has been analyzed to determine whether or not it is a skin block (507), the variance of the denoised block is then either compared with a first adaptive threshold (509), or a second adaptive threshold (511), based on whether or not the block is identified as a skin block. The variance of the denoised block is the variance of the difference between the denoised current block and the co-located denoised block in the previous frame. The first and second thresholds are adaptive thresholds which are adjusted by perceptual input, e.g., a skin-map, and the block brightness level of the current block and frame resolution.

After all blocks in the output frame have sequentially been processed a first time, the denoiser 105 applies a second pass over all blocks of the output frame. In the second pass, each denoised block is sequentially analyzed to determine whether or not a set of connected spatial neighboring blocks have been denoised (519). If the set of connected neighboring blocks have not been denoised (No path out of 519) then the denoised block in the output frame is replaced with its corresponding block from the source frame (521). If the set of connected neighboring blocks have also been denoised, then the denoised block is maintained in the output frame (523). Whether or not a connected neighboring block has been denoised can be determined, for example, using a flag which indicates the status, e.g., denoised or not, of each respective block.

Figure 6A:
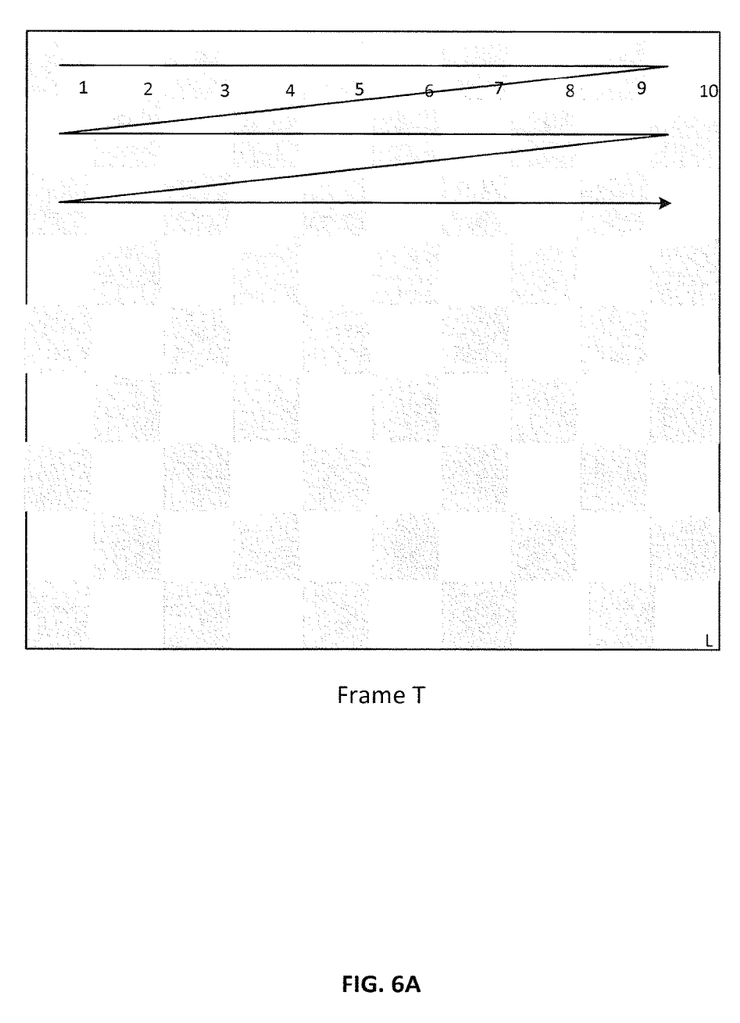
FIGS. 6A and 6B illustrate exemplary checkerboard orders for consecutive frames of a single-pass denoising process according to one embodiment.
Figure 6B:
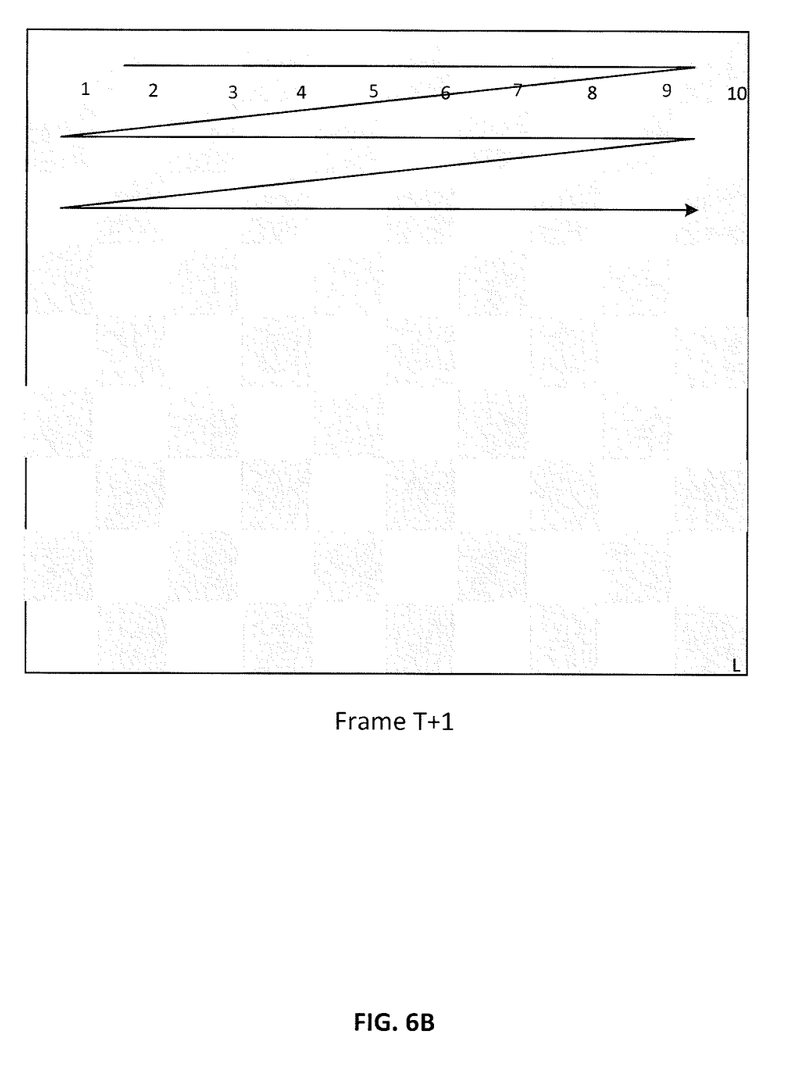
Figure 7:
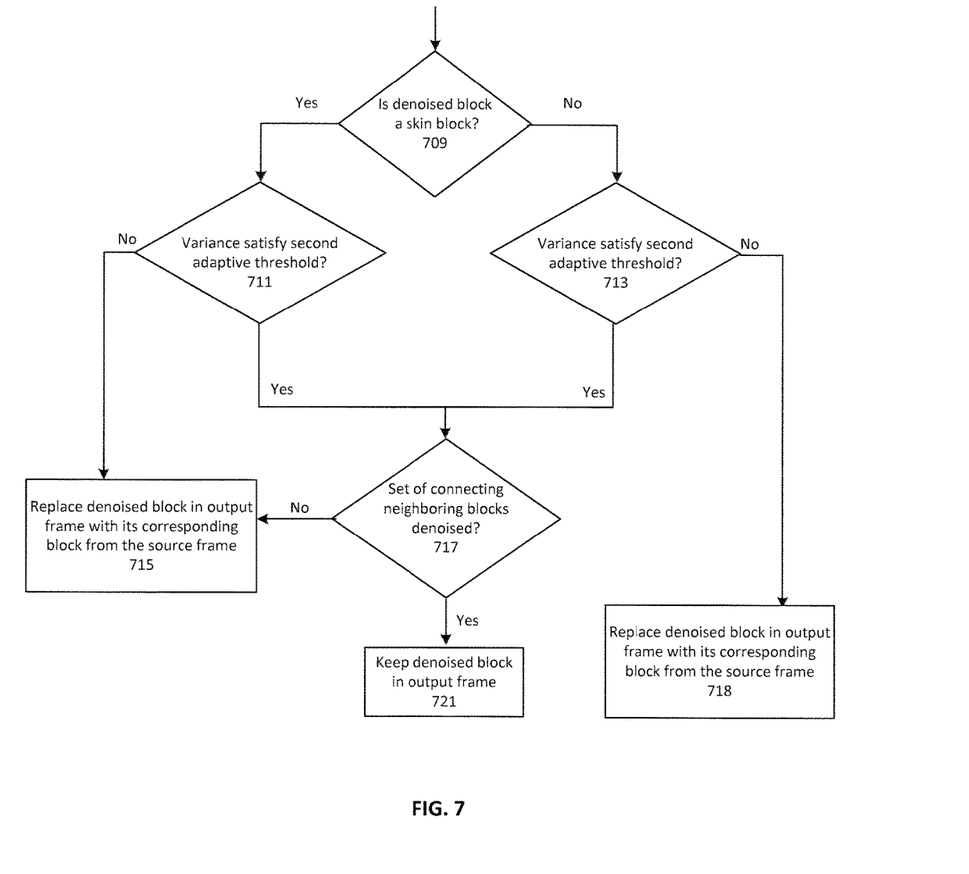
FIG. 7 is a block diagram illustrating an exemplary denoising process for the white blocks of FIGS. 6A and 6B

According to a second exemplary embodiment shown in FIG. 7, the denoiser 105 processes each block of the frame in a checkerboard scan order such that every other block is sequentially processed in a single-pass process. In addition, the starting block, i.e., even or odd, is rotated with each subsequent frame. As shown in FIG. 6A for each block in frame T, the odd blocks (the gray blocks in FIG. 6A) are sequentially processed before the even blocks (the white blocks in FIG. 6A) are sequentially processed. Then when the blocks of the next frame, e.g., Frame T+1 is processed, the even blocks (gray blocks in FIG. 6B) are processed before the odd blocks (white blocks in FIG. 6b) are processed as shown in FIG. 6B.

When denoising the gray blocks, the process is the same as that with the first pass in FIG. 5. However, when processing the white blocks the determination as to whether to keep the denoised block (717) not only depends on whether the variance of the denoised block satisfies the first adaptive threshold (711), or the second adaptive threshold (713), but also whether a set of neighboring gray blocks are denoised (717).

Figure 8:
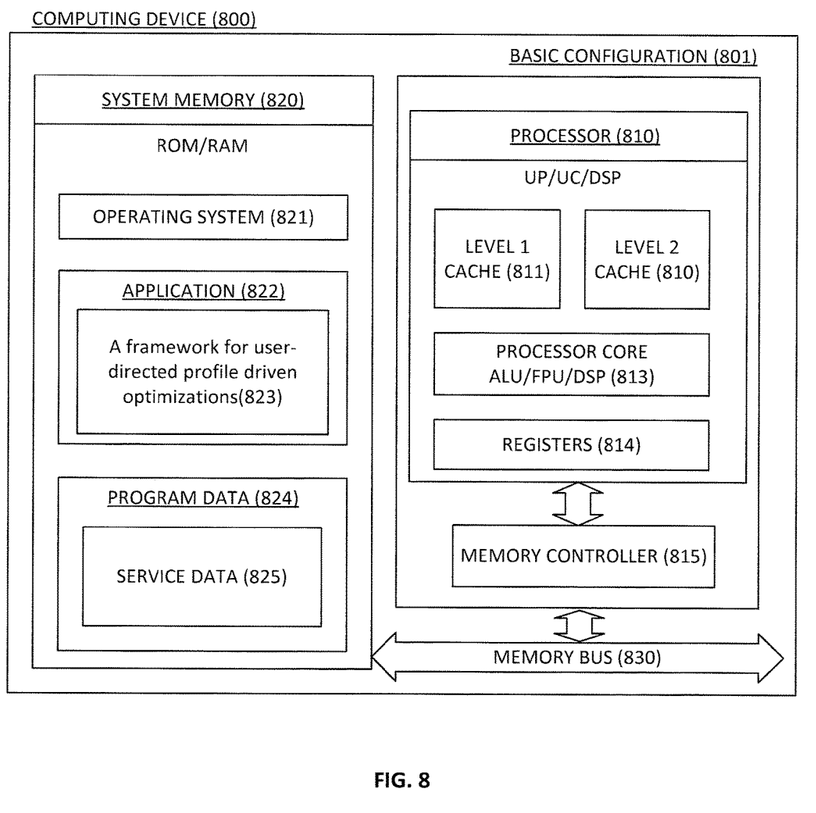
FIG. 8 is a block diagram illustrating an exemplary computing device.

FIG. 8 is a high-level block diagram of an exemplary computing device (800) that is arranged for providing adaptive denoising of source frames in a video conferencing application. In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor ($\mu P$), a microcontroller ($\mu C$), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including but not limited to volatile memory (such as RAM), non-volatile memory (such as ROM, flash memory, etc.) or any combination thereof system memory (820) typically includes an operating system (821), one or more applications (822), and program data (824). The application (822) may include a video conferencing application and an adaptive denoising process for captured video. In some embodiments, the application (822) can be arranged to operate with program data (824) on an operating system (821).

The computing device (800) can have additional features or functionality, and additional interfaces to facilitate communications between the basic configuration (801) and any required devices and interfaces.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for adaptive denoising of source video in a video conferencing application, the method comprising:
   buffering a plurality of source frames from captured video in a source frame buffer;
   filtering the buffered source frames to identify source frames for further processing;
   for each of the filtered source frames
      dividing the filtered source frame into a plurality of blocks, each block having N×N pixels, N being an integer;
      performing a temporal denoising process on each of the plurality of blocks;
      combining the plurality of denoised blocks in to an output frame; and
      scanning the denoised blocks of the output frame and for each denoised block, determining whether to keep the denoised block or replace it with its corresponding block from the filtered source frame; and
   providing the scanned output frames to an encoder.

2. The method of claim 1, wherein the filtering the buffered source frame includes further processing each of the buffered frames.

3. The method of claim 1, further comprising:
   encoding the scanned output frames into a bitstream;
   transmitting the bitstream to a destination device; and
   parsing the bitstream to extract quantization parameters and motion vectors,
   wherein filtering the buffered source frames includes, for each buffered source frame
      determining whether the average quantization employed in the bitstream satisfies a predefined threshold;
      in response to the predefined threshold being satisfied, copying the buffered source directly to an output frame without denoising and providing the output frame to the encoder; and
      in response to the predefined threshold not being satisfied, outputting the filtered source frame for further processing.

4. The method of claim 3, further comprising:
   after dividing the filtered block into a plurality of blocks, filtering the plurality of blocks by comparing an extracted motion vector from a previous encoded frame at the same spatial position with a predefined motion threshold;
   in response to the predefined motion threshold being satisfied, copying the block directly into the output frame without denoising the block; and
   in response to the predefined motion threshold not be satisfied, performing the temporal denoising process on the block.

5. The method of claim 1, wherein scanning the denoised blocks of the output frame comprises:
   sequentially processing each denoised block within the output frame, and
   for each denoised block:
      determining whether the denoised block is a skin block; and
      determining whether the variance of the denoised block satisfies a first adaptive threshold or a second adaptive threshold based on the determination of whether the denoised block is a skin block; and
      in response to first adaptive threshold being satisfied or the second adaptive threshold being satisfied, keeping the denoised block in the output frame; and
      in response to the first adaptive threshold not be satisfied or the second adaptive threshold not being satisfied, replacing the denoised block in the output frame with its corresponding block from the filtered source frame.

6. The method of claim 5, wherein scanning the denoised blocks of the output frame further comprises:
   sequentially scanning the previously scanned output frame, and for each denoised block within the previously scanned output frame,
      determining whether a set of connecting neighbor blocks have been denoised; and
      in response to a determination that the set of connecting neighbor blocks have not been denoised, replacing the denoised block in the output frame with its corresponding block from the filtered source frame.

7. The method of claim 1, wherein scanning the denoised blocks of the output frame comprises:
   processing the denoised blocks in the output frame using a checkerboard pattern such that every other denoised block in the output frame is sequentially processed starting with the odd blocks and then the even blocks.

8. The method of claim 7, wherein the sequential processing of the odd blocks includes, for each odd denoised block:
   determining whether the denoised block is a skin block; and
   determining whether the variance of the denoised block satisfies a first adaptive threshold or a second adaptive threshold based on the determination of whether the denoised block is a skin block; and
   in response to the first adaptive threshold being satisfied or the second adaptive threshold being satisfied, keeping the denoised odd block in the output frame; and
   in response to the first adaptive threshold or the second adaptive threshold not being satisfied or the second adaptive threshold not being satisfied, replacing the denoised block in the output frame with its corresponding block from the filtered source frame.

9. The method of claim 8, wherein the sequential processing of the even blocks includes, for each even denoised block,
   determining whether the denoised block is a skin block; and determining whether the variance of the denoised block satisfies a first adaptive threshold or a second adaptive threshold based on the determination of whether the denoised block is a skin block; and in response to the first adaptive threshold not being satisfied or the second adaptive threshold not being satisfied, replacing the denoised block in the output frame with its corresponding block from the filtered source frame; and in response to the first adaptive threshold being satisfied or the second adaptive threshold being satisfied, determining whether a set of connecting odd neighbor blocks have been denoised; and in response to a determination that the set of connecting odd neighbor blocks have not been denoised, replacing the denoised block in the output frame with its corresponding block from the filtered source frame; and in response to a determination that the set of connecting odd neighbor blocks has been denoised, keeping the denoised in the output frame.

10. The method of claim 8, wherein for every other frame, the sequential processing of the denoised blocks in a checkerboard pattern starts with the even blocks and then the odd blocks.

11. The method of claim 10, wherein the sequential processing of the even blocks includes, for each even denoised block determining whether the denoised block is a skin block; and determining whether the variance of the denoised block satisfies a adaptive first threshold or a second adaptive threshold based on determination of whether the denoised block is a skin block; and in response to the adaptive first threshold or the second adaptive threshold being satisfied, keeping the denoised even block in the output frame;

in response to the first adaptive threshold or the second adaptive threshold not being satisfied, replacing the denoised block with its corresponding block from the filtered source frame.

12. The method of claim 11, wherein the sequential processing of the odd blocks including, for each odd denoised block, determining whether the denoised block is a skin block; and determining whether the variance of the denoised block satisfies a first adaptive threshold or a second adaptive threshold based on the determination of whether the denoised block is a skin block; and in response to the first adaptive threshold not being satisfied or the second adaptive threshold not being satisfied, replacing the denoised block in the output frame with its corresponding block from the filtered source frame; and in response to the first adaptive threshold being satisfied or the second adaptive threshold being satisfied, determining whether a set of connecting even neighbor blocks have been denoised; and in response to a determination that the set of connecting even neighbor blocks have not been denoised, replacing the denoised block in the output frame with its corresponding block from the filtered source frame; and in response to a determination that the set of connecting odd neighbor blocks has been denoised, keeping the denoised in the output frame.

13. A mobile device, comprising
a video capturing device;
a video encoder;
a source frame buffer that stores video frames from the video capturing device; and
a processor configured to:
buffer a plurality of source frames from captured video in a source frame buffer;
filter the buffered source frames to identify source frames for further processing;
for each of the filtered source frames
divide the filtered source frame into a plurality of blocks, each block having N×N pixels, N being an integer;
perform a temporal denoising process on each of the plurality of blocks; and
combine the plurality of denoised blocks in to an output frame; and
scan the denoised blocks of the output frame and for each denoised block, determine whether to keep the denoised block or replace it with its corresponding block from the filtered source frame; and
provide the scanned output frames to the encoder.

14. The device of claim 13, wherein the filtering the buffering source frame includes further processing each of the buffered frames.

15. The device of claim 13, wherein the processor is further configured to:
encode the scanned output frames into a bitstream;
transmit the bitstream to a destination device; and
parse the bitstream to extract quantization parameters and motion vectors,
wherein filtering the buffered source frames includes, for each buffered source frame
determining whether the average quantization employed in the bitstream satisfies a predefined threshold;
in response to the predefined threshold being satisfied, copying the buffered source directly to an output frame without denoising and providing the output frame to the encoder; and
in response to the predefined threshold not being satisfied, outputting the filtered source frame for further processing.

16. The method of claim 15, wherein the processor is further configured to:
filter, after dividing the filtered block into a plurality of blocks, the plurality of blocks by comparing an extracted motion vector from a previous encoded frame at the same spatial position with a predefined motion threshold;
copy, in response to the predefined motion threshold being satisfied, the block directly into the output frame without denoising the block; and
perform, in response to the predefined motion threshold not be satisfied, the temporal denoising process on the block.

17. The device of claim 13, wherein scanning the denoised blocks of the output frame comprises:
sequentially processing each denoised block within the output frame, and for each denoised block:
determining whether the denoised block is a skin block; and
determining whether the variance of the denoised block satisfies a first adaptive threshold or a second adaptive threshold based on the determination of whether the denoised block is a skin block;

in response to first adaptive threshold being satisfied or the second adaptive threshold being satisfied, keeping the denoised block in the output frame; and in response to the first adaptive threshold not be satisfied or the second adaptive threshold not being satisfied, replacing the denoised block in the output frame with its corresponding block from the filtered source frame.

18. The method of claim 17, wherein scanning the denoised blocks of the output frame further comprises:

sequentially scanning the previously scanned output frame, and for each denoised block within the previously scanned output frame, determining whether a set of connecting neighbor blocks have been denoised; and in response to a determination that the set of connecting neighbor blocks have not been denoised, replacing the denoised block in the output frame with its corresponding block from the filtered source frame.

19. The method of claim 13, wherein scanning the denoised blocks of the output frame comprises:

processing the denoised blocks in the output frame using a checkerboard pattern such that every other denoised block in the output frame is sequentially processed starting with the odd blocks and then the even blocks.

20. The method of claim 19, wherein the sequential processing of the odd blocks includes, for each odd denoised block:

determining whether the denoised block is a skin block; and determining whether the variance of the denoised block satisfies a first adaptive threshold or a second adaptive threshold based on the determination of whether the denoised block is a skin block; and in response to the first adaptive threshold being satisfied or the second adaptive threshold being satisfied, keeping the denoised odd block in the output frame; and in response to the first adaptive threshold or the second adaptive threshold not being satisfied or the second adaptive threshold not being satisfied, replacing the denoised block in the output frame with its corresponding block from the filtered source frame.

21. The method of claim 20, wherein the sequential processing of the even blocks includes, for each even denoised block, determining whether the denoised block is a skin block; and determining whether the variance of the denoised block satisfies a first adaptive threshold or a second adaptive threshold based on the determination of whether the denoised block is a skin block; and in response to the first adaptive threshold not being satisfied or the second adaptive threshold not being satisfied, replacing the denoised block in the output frame with its corresponding block from the filtered source frame; and in response to the first adaptive threshold being satisfied or the second adaptive threshold being satisfied, determining whether a set of connecting odd neighbor blocks have been denoised; and in response to a determination that the set of connecting odd neighbor blocks have not been denoised, replacing the denoised block in the output frame with its corresponding block from the filtered source frame; and in response to a determination that the set of connecting odd neighbor blocks has been denoised, keeping the denoised in the output frame.

22. The device of claim 19, wherein for every other frame, the sequential processing of the denoised blocks in a checkerboard pattern starts with the even blocks and then the odd blocks.

23. The device of claim 22, wherein the sequential processing of the even blocks includes, for each even denoised block determining whether the denoised block is a skin block; and determining whether the variance of the denoised block satisfies a adaptive first threshold or a second adaptive threshold based on determination of whether the denoised block is a skin block; and in response to the adaptive first threshold or the second adaptive threshold being satisfied, keeping the denoised even block in the output frame;

in response to the first adaptive threshold or the second adaptive threshold not being satisfied, replacing the denoised block with its corresponding block from the filtered source frame.

24. The device of claim 23, wherein the sequential processing of the odd blocks including, for each odd denoised block, determining whether the denoised block is a skin block; and determining whether the variance of the denoised block satisfies a first adaptive threshold or a second adaptive threshold based on the determination of whether the denoised block is a skin block; and in response to the first adaptive threshold not being satisfied or the second adaptive threshold not being satisfied, replacing the denoised block in the output frame with its corresponding block from the filtered source frame; and in response to the first adaptive threshold being satisfied or the second adaptive threshold being satisfied, determining whether a set of connecting even neighbor blocks have been denoised; and in response to a determination that the set of connecting even neighbor blocks have not been denoised, replacing the denoised block in the output frame with its corresponding block from the filtered source frame; and in response to a determination that the set of connecting odd neighbor blocks has been denoised, keeping the denoised in the output frame.

* * * * *